United States Patent
Arnold et al.

(10) Patent No.: US 12,429,028 B2
(45) Date of Patent: Sep. 30, 2025

(54) WIND TURBINE AND METHOD FOR CONTROLLING A WIND TURBINE

(71) Applicant: Wobben Properties GmbH, Aurich (DE)

(72) Inventors: Matthias Arnold, Aurich (DE); Steffen Busemann, Bremen (DE); Hussam Daboul, Südbrookmerland (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/531,493

(22) Filed: Dec. 6, 2023

(65) Prior Publication Data
US 2024/0191690 A1 Jun. 13, 2024

(30) Foreign Application Priority Data
Dec. 8, 2022 (EP) .................................. 22212206

(51) Int. Cl.
*F03D 7/04* (2006.01)
*F03D 1/00* (2006.01)
*F03D 80/60* (2016.01)

(52) U.S. Cl.
CPC ............... *F03D 7/04* (2013.01); *F03D 1/125* (2023.08); *F03D 80/601* (2023.08); *F05B 2220/30* (2013.01); *F05B 2240/14* (2013.01); *F05B 2260/232* (2013.01)

(58) Field of Classification Search
CPC .... F03D 80/60; F03D 80/601; F05B 2240/14; F05B 2260/232; F05B 2260/20; F05B 2260/221; F05B 2260/222; F05B 2260/224; F05B 2260/2241; F05B 2270/303; F05B 2270/402
See application file for complete search history.

(56) References Cited

U.S. PATENT DOCUMENTS

| | | | | |
|---|---|---|---|---|
| 4,924,826 A | * | 5/1990 | Vinson | F01P 7/12 123/195 C |
| 5,984,196 A | * | 11/1999 | Godsey | G05D 23/08 454/258 |
| 7,559,391 B2 | * | 7/2009 | Bradley | B60K 11/085 180/68.1 |
| 8,109,814 B2 | * | 2/2012 | Uchino | F03D 80/60 290/55 |
| 8,511,989 B2 | * | 8/2013 | Matsushita | F03D 80/60 416/37 |

(Continued)

FOREIGN PATENT DOCUMENTS

| | | |
|---|---|---|
| DE | 102007016577 A1 | 10/2008 |
| EP | 2218909 A2 | 8/2010 |

*Primary Examiner* — Brian P Wolcott
(74) *Attorney, Agent, or Firm* — Seed Intellectual Property Law Group LLP

(57) ABSTRACT

A wind turbine with a tower and a nacelle with a nacelle housing is provided. The nacelle is placed on the tower. Further provided is a cooling flap, which is configured to close an opening in or on the area of the wind turbine to be cooled. At least one temperature-dependent passive actuator is configured to activate and open the cooling flap as a function of temperature, so as to enable a heat compensation in the area to be cooled by means of the opening. The temperature-dependent passive actuator can change its shape and/or its length without any external electrical energy as a function of temperature.

6 Claims, 4 Drawing Sheets

(56) References Cited

U.S. PATENT DOCUMENTS

| | | | |
|---|---|---|---|
| 8,585,358 B2* | 11/2013 | Matsuo | F03D 9/25 |
| | | | 415/176 |
| 9,624,908 B2* | 4/2017 | Airoldi | F03D 9/25 |
| 10,264,782 B2* | 4/2019 | Amundsen | F03D 80/60 |
| 10,563,639 B2* | 2/2020 | Van Den Aker | F03G 7/065 |
| 12,025,103 B2* | 7/2024 | Daboul | F03D 1/0675 |
| 12,085,062 B2* | 9/2024 | Harich | F03D 7/04 |
| 2013/0255796 A1* | 10/2013 | Dimascio | F03D 7/022 |
| | | | 137/334 |

* cited by examiner

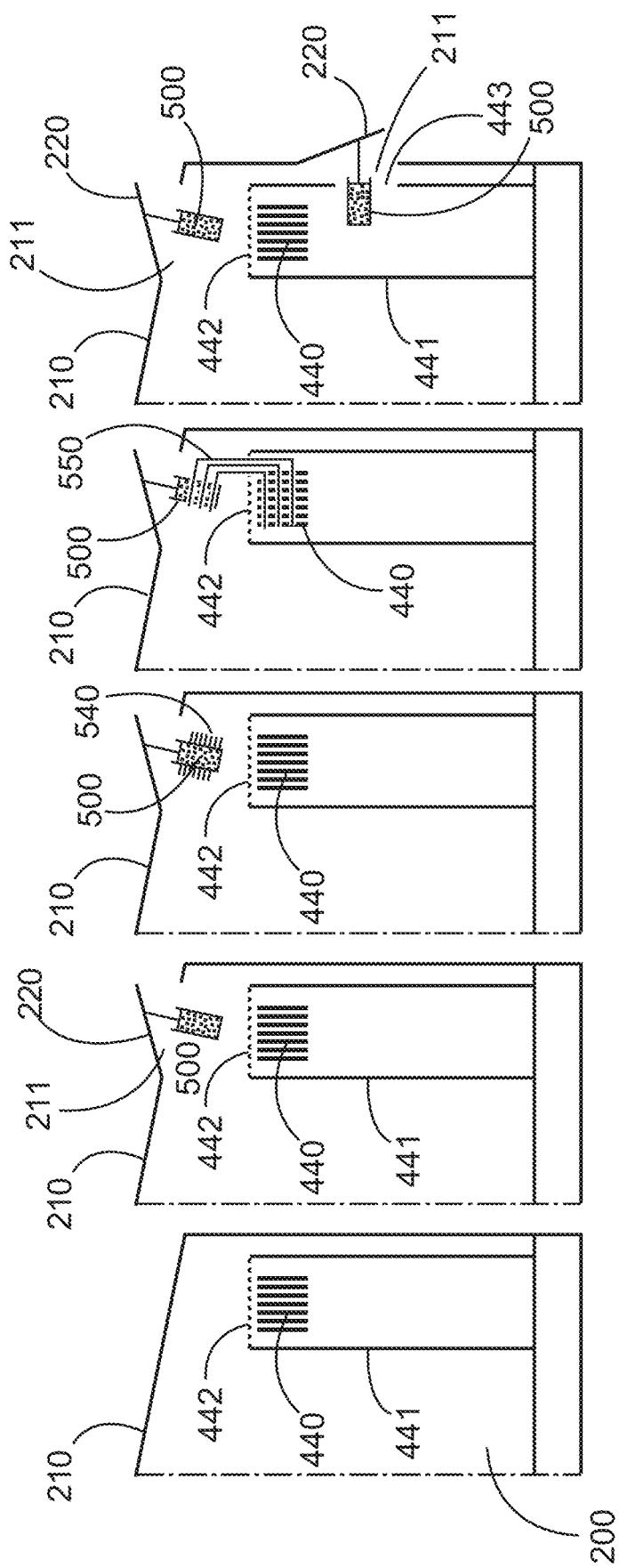

WIND TURBINE AND METHOD FOR CONTROLLING A WIND TURBINE

BACKGROUND

Technical Field

The present invention relates to a wind turbine as well as to a method for controlling a wind turbine.

Description of the Related Art

A wind turbine typically has a tower and a nacelle on the tower. The electric generator is provided as a heat source in the nacelle, along with additional heat sources in the form of power electronic units. In particular during the conversion of the voltage generated by the generator, the power electronic units generate heat losses during their operation. Depending on the layout of the wind turbine and the generator, the heat sources in the nacelle must be actively or passively cooled. Active cooling can involve active air cooling or active liquid cooling.

BRIEF SUMMARY

Some embodiments provide a wind turbine as well as a method for controlling a wind turbine, which enables an improved cooling of the wind turbine.

Therefore provided is a wind turbine with a tower and a nacelle with a nacelle housing. The nacelle is placed on the tower. Further provided is a cooling flap, which is configured to close an opening in or on the area of the wind turbine to be cooled. At least one temperature-dependent passive actuator is configured to actuate and open the cooling flap as a function of temperature, so as to enable a heat compensation in the area to be cooled by means of the opening. The temperature-dependent passive actuator can change its shape and/or length without external electrical energy as a function of the temperature.

An area of the wind turbine (to be cooled) is provided, which has an opening that can be closed by a cooling flap. Alternatively thereto, the opening can be provided between two areas of the wind turbine which vary in terms of heat development. The cooling flap can be opened by a temperature-dependent passive actuator. The opening can be provided on an outer wall or exterior side of the wind turbine.

Therefore provided is a wind turbine with a tower and an area to be cooled. The area to be cooled can consist of a nacelle, a tower, a hub and/or some other structure of the wind turbine. Several heat sources can be present in the nacelle, for example the generator as well as power electronic units.

In some embodiments, the nacelle has a nacelle housing with at least one closable opening or one cooling flap to be opened. This opening serves as the cooling opening. Opening the opening allows heat in the nacelle housing to be dissipated. The opening or the cooling flap is actuated by a temperature-dependent passive actuator once a limit temperature has been reached. As a result, heat generated inside of the nacelle housing can at least partially escape through the opening. This allows for a passively actuatable option for cooling the generator as well as the power electronic units inside of the nacelle housing. Because the actuator is temperature-dependent and passive, it can also open the cooling flap or the opening even if the wind turbine is not connected to the power supply network and/or if an operating state of the wind turbine makes it impossible to extract enough energy, if any, from the energy supply network for actively cooling. In particular, this can be the case given a network error, so that the wind turbine cannot deliver any power into the energy supply network to which it is connected. Furthermore, it can happen that the wind turbine generates energy owing to the inertia of the aerodynamic rotor that is coupled with the generator. For example, this energy can be converted into heat by means of a chopper.

A method for controlling a wind turbine is provided. The wind turbine has an area to be cooled (e.g., a nacelle, a tower, a hub and/or some other structure with at least one heat source). The heat source can consist of a generator or a power electronics unit inside of the nacelle. This or some other heat source, in particular a chopper, is only active if an error is present in the network (error mode), so that the wind turbine cannot deliver any energy into the energy supply network. The nacelle has a nacelle housing with at least one opening, which can be closed by a cooling flap. A temperature-dependent passive actuator is provided for opening the cooling flap. Once a specific limit temperature has been reached inside of the nacelle or at specific locations inside of the nacelle, the passive actuator is activated, so that the cooling flap is opened.

The temperature-dependent passive actuator can be a bi-material element with a first and second material section, which have different heat expansion coefficients. The bi-material section can have two plastics, other materials, or material mixtures with different heat expansion coefficients. Alternatively thereto, the actuator can be configured like a cylinder filled with oil, wherein the oil in the cylinder expands as the temperature rises, which leads to a change in the dimensions of the cylinder, i.e., to a change in length, as a result of which the cooling flap can be opened. Alternatively thereto, the accumulator can be configured as a cylinder filled with a material that expands under the influence of heat (e.g., oil). This leads to an expanded length of the cylinder.

Alternatively thereto, the temperature-dependent passive actuator can be configured as a melting cylinder. Provided inside of the cylinder is a material which melts at a limit temperature, and then expands, which leads to a change in the geometry of the melting cylinder, i.e., in length, so that the cooling flap can be opened.

The actuator configured as a bimetal actuator has two welded metal sections with different heat expansion coefficients. The oil cylinder actuator has a cylinder filled with oil, wherein the oil expands as the temperature rises. For example, the melting cylinder actuator has a cylinder filled with wax, wherein the wax expands as temperature rises and in the melting process.

The temperature-dependent passive actuator thus enables a reliable option that can be used at short notice for cooling the heat sources in the nacelle housing, without any energy having to be supplied from outside for this purpose.

The passive temperature-dependent actuator can be provided for opening and closing a cooling flap in a nacelle housing. The cooling flap is changed as a function of temperature. In particular, a temperature increase inside of the nacelle can take place in the event of an error involving the wind turbine. In particular if the wind turbine is unable to deliver any energy to the connected energy supply network, but continues to generate energy, this energy must be consumed. For example, this takes place by using a chopper, i.e., by converting the electrical energy into heat. Since the chopper is provided in a nacelle housing, this leads to an increase in temperature inside of the nacelle housing. In order to limit the temperature or lower it again, use is made of the passive temperature-dependent actuator, which opens the cooling flap, so that heat can escape through the opening in the nacelle housing. It must be possible to operate the passive temperature-dependent actuator independently of any electrical energy supplied from outside, since in the error case described above, the wind turbine is unable to draw any energy from the energy supply network for controlling corresponding components. This is why the actuator is configured as a passive temperature-dependent actuator. As a result, a situation can be achieved in which the actuator can also ensure its operation when no electrical energy is present for controlling other components.

The passive temperature-dependent actuator can also be built into already existing nacelle housings. It can be used to open an existing cooling flap. Alternatively thereto, an opening with a cooling flap must likewise be provided in the nacelle housing.

The passive temperature-dependent actuator for opening the cooling flap in the nacelle housing is advantageous in particular if a chopper that generates heat while operating is provided in the nacelle housing.

An area of the wind turbine to be cooled has an opening with a cooling flap, which can be opened by a temperature-dependent passive actuator.

BRIEF DESCRIPTION OF THE SEVERAL VIEWS OF THE DRAWINGS

Advantages and exemplary embodiments will be described in more detail below with reference to the drawings.

FIGS. 4A to 4E each show a cutout of a nacelle of a wind turbine with different passive temperature-dependent actuators.

FIG. 5 shows a graph to illustrate a time dependence of an air temperature in the nacelle for different cooling configurations.

DETAILED DESCRIPTION

Figure 1:
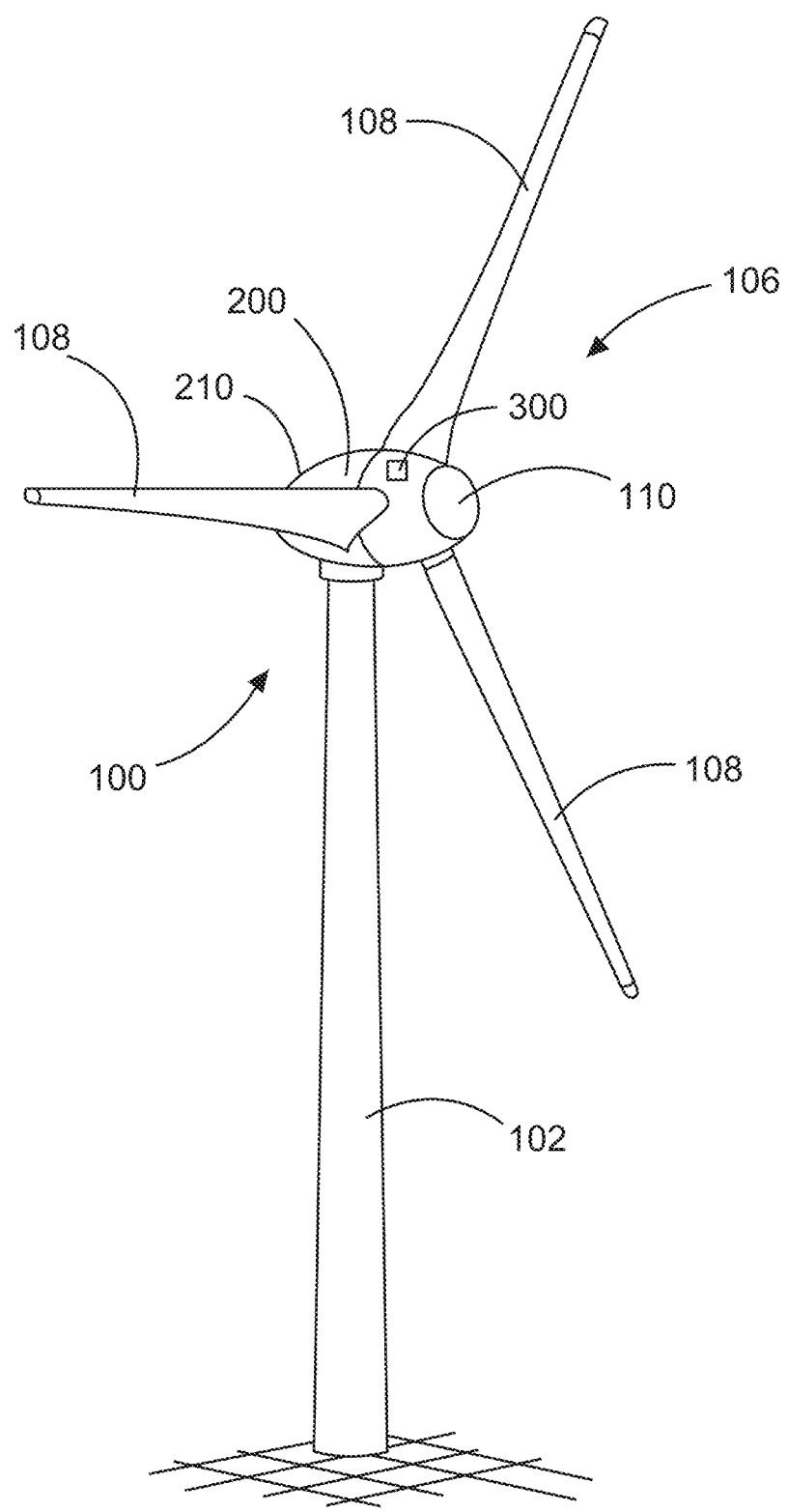
FIG. 1 shows a schematic view of a wind turbine.

FIG. 1 shows a schematic view of a wind turbine. The wind turbine 100 has a tower 102 with a nacelle 200 on the tower. The wind turbine has an aerodynamic rotor 106 with a spinner 110 and three rotor blades 108. The nacelle 200 has a nacelle housing 210. The wind turbine 100 has an electric generator 300, which is directly or indirectly coupled with the aerodynamic rotor 106. During rotation of the aerodynamic rotor 106, the rotor of the generator 300 is set in motion, so that the generator generates electrical energy.

Figure 2:
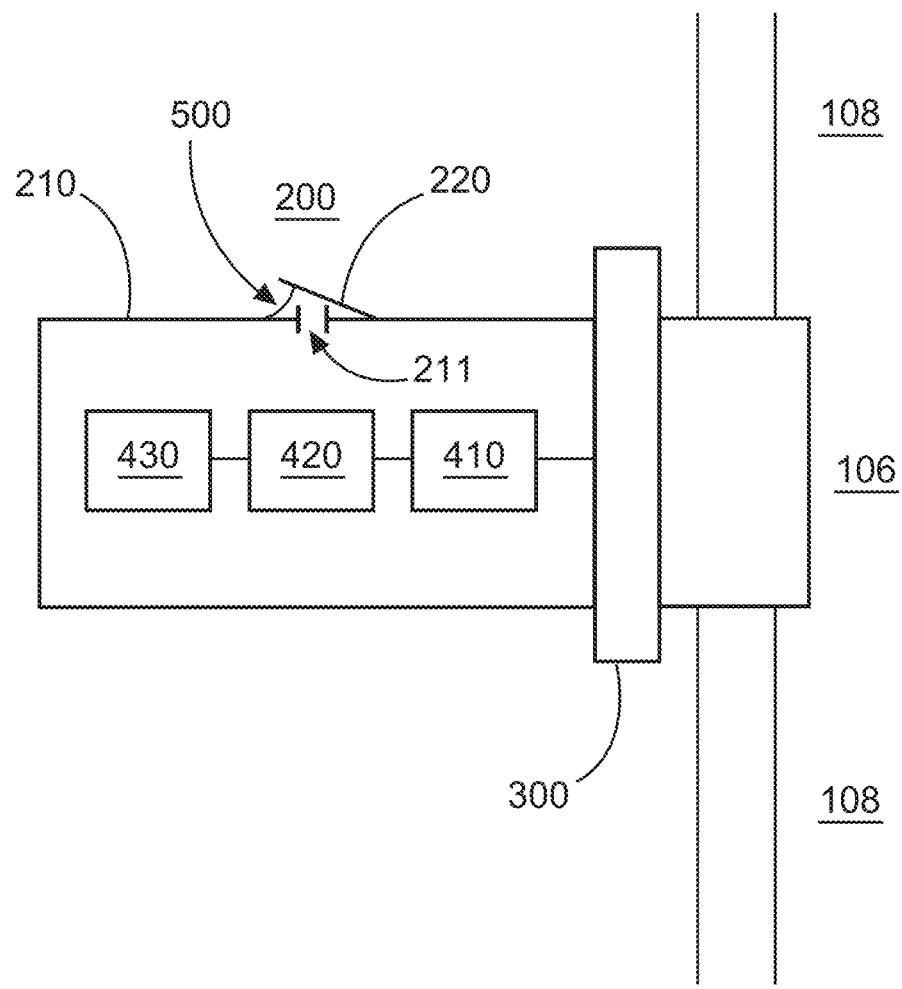
FIG. 2 shows a schematic view of a nacelle of a wind turbine.

FIG. 2 shows a schematic view of a nacelle of a wind turbine. The nacelle 200 has a nacelle housing 210 and at least one opening 211, which can be closed by a cooling flap 220. An electric generator 300 is directly or indirectly coupled with an aerodynamic rotor 106, wherein the rotor has rotor blades 108. The electric generator 300 is coupled with several power electronic units 410, 420, 430. These three power electronic units 410, 420, 430 are arranged inside of the nacelle housing 210. For example, the power electronic units 410, 420, 430 can consist of a rectifier 410, a DC link 420 and a chopper 430. Alternatively thereto, additional power electronic units 210 can also be arranged in the nacelle housing. For example, this type of power electronic unit can be an inverter. During operation of the wind turbine, the generator 300 and the power electronic units can generate heat, i.e., they are heat sources. The nacelle can thus represent an area to be cooled 200.

The wind turbine 100 can have a normal operating mode and at least one error operating mode.

During wind turbine operation, the aerodynamic rotor 106 rotates, and sets a rotor of the generator 300 in motion. As a result, the electric generator 300 generates electrical energy, which is delivered to the first power electronics unit 410, for example for rectification purposes. After rectification by the rectifier 410, a DC link 420 can be provided. The chopper 430 can be used to convert energy that has been generated by the generator but cannot be delivered to the energy supply network into heat. This can take place in particular in the event of an error, i.e., given a network error. It can here come about that the wind turbine must not deliver any energy to the energy supply network. However, given the inertia of the aerodynamic rotor 106, a situation can arise where the generator continues to generate energy. Since this energy cannot be delivered to the energy supply network, this energy can be converted into heat by the chopper 430 in an error operating mode. During chopper operation, i.e., while the electrical energy generated by the generator is being converted into heat, a significant increase in temperature inside of the nacelle housing 210 inevitably takes place. This temperature increase can have a detrimental impact on the power electronic units or other components inside of the nacelle housing 210. In order to prevent this, at least one temperature-dependent actuator 500 is provided that can open the cooling flap 220 at the opening 211 in the nacelle housing 210.

Figure 3A:
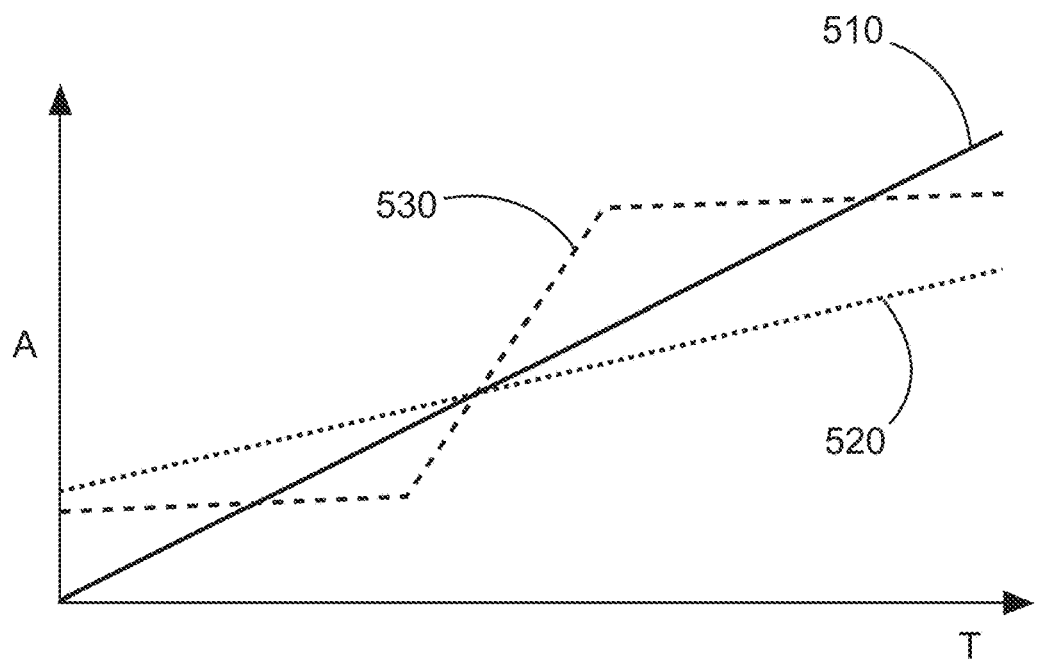
FIG. 3A shows a graph to illustrate the expansion of different passive actuators via the temperature.
Figure 3B:
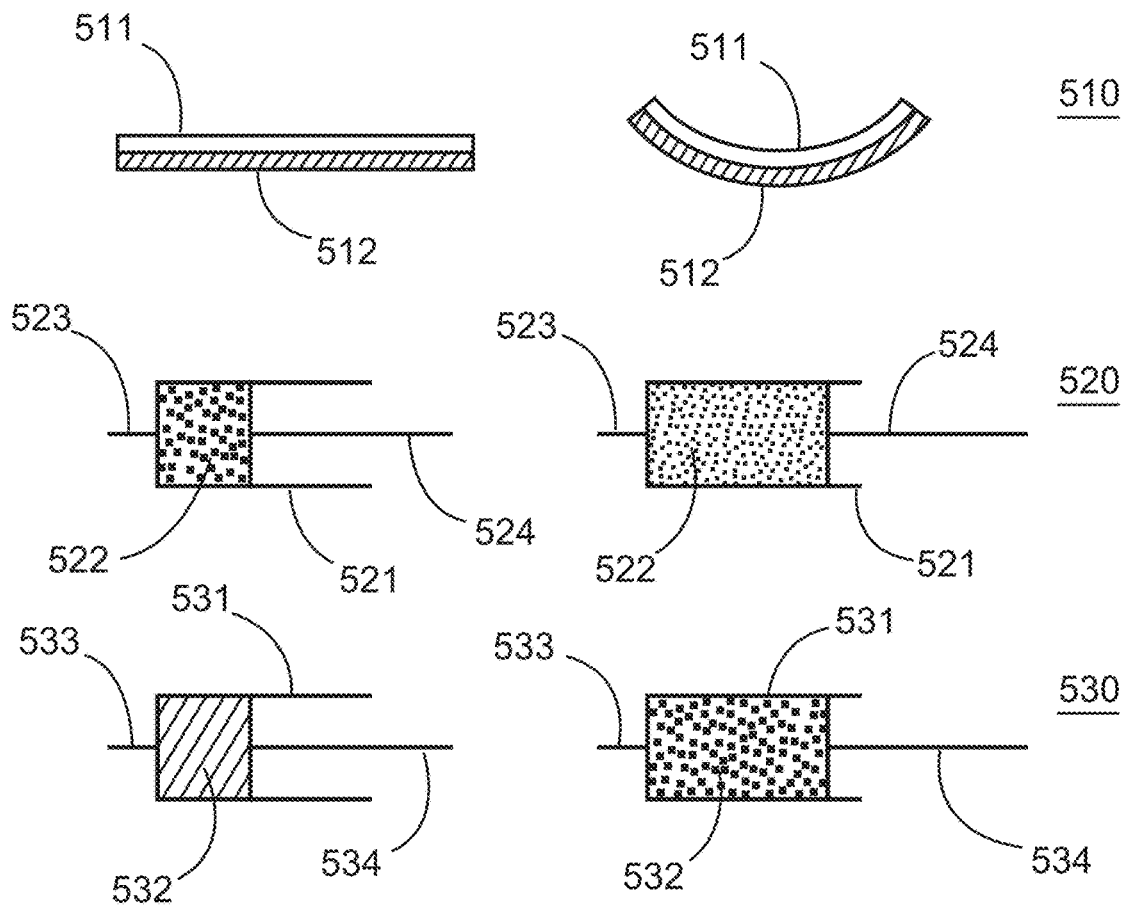
FIG. 3B shows different passive temperature-dependent actuators.

FIG. 3A shows a graph to illustrate the expansion of different passive actuators via the temperature. FIG. 3B shows different examples of the passive actuators. FIG. 3A shows the temperature-dependent expansion of a melting cylinder 530, a bimetal actuator 510 and an oil cylinder 520. The bimetal actuator 510 as well as the oil cylinder actuator 520 each have a linear correlation between rising temperature and expansion. Only for the melting cylinder actuator 530 is there no linear correlation. Instead, no notable expansion takes place up to a limit value. Only starting with the limit value does an expansion of the cylinder to a second limit value take place as temperature rises. No notable additional expansion takes place above the second limit value, even given a rising temperature.

The passive temperature-dependent actuator 500 is used to open an opening 211 in a nacelle housing 210 as a function of temperature. The actuator 500 can be configured as a bimetal actuator 510. To this end, the bimetal actuator has a first and second metal section 511, 512, which are made out of a different material and have different heat expansion coefficients. During a temperature increase, the first and second metal sections 511. 512 expand differently, which leads to a change in shape, for example a bending or curvature of the bimetal actuator 510.

Alternatively thereto, the passive temperature-dependent actuator can be configured as an actuator with an oil cylinder. The oil cylinder 520 has a cylinder section 521 and a first and second end 523, 524. Provided inside of the cylinder 521 is a heat expanding material, e.g., such as oil 522, which expands as temperature increases, so that a length of the oil cylinder is enlarged given a temperature increase. This is shown on FIG. 3.

The passive temperature-dependent actuator can further be configured as a melting cylinder 530. The melting cylinder 530 has a cylinder 531 and a first and second end 533, 534. Further provided is a melting material 532 in the cylinder 531. As the temperature rises, the material 532 melts until it is in a liquid state (see right image on FIG. 3B). This leads to an expansion of the material 532, and hence to a change in length of the melting cylinder.

The actuator can at least partially have thermal ribs for an improved and faster activation of the temperature-dependent passive actuator. Alternatively thereto, the actuator can be coupled with a heat pipe or a heat pipe, so as to improve how a temperature, for example of the chopper, is relayed to the temperature-dependent passive actuator, so that a reaction can take place quickly, and the cooling flap of the opening is opened.

This also enables a quick reaction to an excessive temperature inside of the nacelle housing, and in particular in the area of the chopper.

FIG. 4A to 4F each show a cutout of a nacelle of a wind turbine. FIG. 4A shows the nacelle housing 210 with a power electronics unit 430, which can have a chopper 430. The nacelle housing 210 according to FIG. 4A can optionally have an opening (not shown) for active cooling. Active cooling can take place when enough energy is available.

FIG. 4B shows a nacelle housing with a power electronics unit and a chopper. The chopper 440 has a chopper housing 441 optionally with at least one opening 442. Provided in the housing 210 is an opening 211, which can be closed by a cooling flap 220. Further provided is a temperature-dependent passive actuator 500, which is coupled with the cooling flap 220, and opens the cooling flap when a corresponding limit temperature is exceeded.

FIG. 4C shows the structure of FIG. 4B, wherein the actuator 510 has a plurality of surface enlargements, e.g., in the form of ribs 510.

FIG. 4D is based on the configuration of the nacelle housing on FIG. 4B, wherein a heat pipe or a heat pipe 550 is provided between the chopper and the passive actuator.

FIG. 4E shows a situation as depicted on FIG. 4B, wherein an additional opening 211 is provided in the nacelle housing 210 with an additional cooling flap 220. As a consequence, several openings with several cooling flaps can be opened by the temperature-dependent passive actuators as a function of temperature.

FIG. 5 shows a graph to illustrate a time dependence of an air temperature in the nacelle for different cooling configurations. Provided in particular is the case without cooling A1 (see FIG. 4A), and a case A2 with openings 211 in the nacelle housing 210, and a cooling flap 200 that can be closed or is to be opened by means of a passive actuator 500 (see FIG. 4B). Further depicted is a ribbed configuration of the actuator A3 as well as a configuration with a heat pipe or a heat pipe (see FIG. 4C).

REFERENCE LIST

100 Wind turbine
102 Tower
106 Rotor
108 Rotor blades
110 Spinner
200 Nacelle
210 Nacelle housing
211 Opening
220 Cooling flap
300 Generator
410 Power electronic units
420 Power electronic units
430 Power electronic units
440 Chopper
441 Chopper housing
442 Opening
500 Passive actuator
510 Bimetal actuator
511 First metal section
512 Second metal section
520 Oil cylinder
521 Cylinder section
522 Oil
523 First end
524 Second end
530 Melting cylinder
531 Cylinder
532 Melting material
533 First end
534 Second end
550 Heat pipe European patent application no. 22212206.1, filed Dec. 8, 2022, to which this application claims priority, is hereby incorporated herein by reference, in its entirety.

The invention claimed is:

1. A wind turbine, comprising:
a tower;
a nacelle with a nacelle housing, which is placed on the tower;
at least one cooling flap, which is configured to close an opening in or on an area of the wind turbine to be cooled; and
at least one temperature-dependent passive actuator, which is coupled to the cooling flap and is configured to activate and open the cooling flap as a function of temperature, so as to enable a heat compensation in the area to be cooled by means of the opening,
wherein the at least one temperature-dependent passive actuator is configured to change its length without external electrical energy as a function of the temperature to open or close the at least one cooling flap,
wherein the wind turbine has a normal operating mode, and an error operating mode, in which the wind turbine is not connected to an energy supply network and/or not enough energy is being supplied for active cooling, and in which a temperature exceeds a limit value in the area of the wind turbine, and
wherein the at least one temperature-dependent passive actuator is configured to open the at least one cooling flap as a function of temperature in the error operating mode, so as to enable the heat compensation in the area of the wind turbine.

2. The wind turbine according to claim 1, wherein the area of the wind turbine is configured as the nacelle housing with at least one opening, which can be closed by means of the at least one cooling flap.

3. The wind turbine according to claim 1, wherein:
the nacelle housing has at least one heat source in the form of an electric generator and/or a power electronics unit, wherein at least one power electronics unit generates a quantity of heat that exceeds a threshold value in an error operating mode, and
wherein the at least one passive temperature-dependent passive actuator is configured to open the at least one cooling flap as a function of the heat generated by the power electronics unit.

4. The wind turbine according to claim 1, wherein:
the passive temperature-dependent actuator is configured as a bimetal actuator, as an oil cylinder with a temperature-dependent expansion, or as a melting cylinder with a temperature-dependent expansion.

5. The wind turbine according to claim 1, wherein:
the at least one passive temperature-dependent passive actuator has a surface enlargement on its surface to improve a heat exchange.

6. The wind turbine according to claim 1, further comprising:
a heat pipe between a heat source and the at least one passive temperature-dependent passive actuator.

\* \* \* \* \*